(12) United States Patent
Kuo et al.

(10) Patent No.: US 8,351,138 B2
(45) Date of Patent: Jan. 8, 2013

(54) LENS DRIVING DEVICE, FLEXIBLE PIECE AND THE METHOD FOR MANUFACTURING THE FLEXIBLE PIECE

(75) Inventors: Li-Te Kuo, Hsinchu County (TW); Chien-Liang Chen, Kaohsiung (TW); Mei-Ling Lai, Taichung (TW); Wen-Hsiung Chang, Yunlin County (TW)

(73) Assignee: Wah Hong Industrial Corp., Kaohsiung (TW)

( * ) Notice: Subject to any disclaimer, the term of this patent is extended or adjusted under 35 U.S.C. 154(b) by 136 days.

(21) Appl. No.: 12/897,956

(22) Filed: Oct. 5, 2010

(65) Prior Publication Data
US 2011/0080661 A1    Apr. 7, 2011

(30) Foreign Application Priority Data
Oct. 6, 2009   (TW) .............................. 98133823 A (51) Int. Cl.
*G02B 7/02*   (2006.01)

(52) U.S. Cl. ......................... 359/811; 359/819; 359/822

(58) Field of Classification Search .......... 359/694–704, 359/811–824
See application file for complete search history.

(56) References Cited

U.S. PATENT DOCUMENTS
| | | | |
|---|---|---|---|
| 7,525,739 B2* | 4/2009 | Lin | 359/696 |
| 7,760,453 B2* | 7/2010 | Kuo et al. | 359/824 |
| 2009/0102403 A1* | 4/2009 | Lule | 318/135 |

FOREIGN PATENT DOCUMENTS
JP    2000249894 A   *   9/2000

* cited by examiner

*Primary Examiner* — Mohammed Hasan
(74) *Attorney, Agent, or Firm* — Rosenberg, Klein & Lee (57) ABSTRACT

A lens displacement device includes a flexible piece, a fixed element and a mobile element. The flexible piece has a support, a flexible part and an oscillation absorber. The flexible part connects to the support and at least one gap exists between the flexible part and the support. The oscillation absorber is installed in the gap between the flexible part and the support. Moreover, the fixed element couples to the support of the flexible piece, and the mobile element couples to the flexible part of the flexible piece. Furthermore, the flexible part of the flexible piece is deformed in shape for providing a restoration force with the mobile element. A manufacturing process of the flexible piece is also disclosed.

15 Claims, 7 Drawing Sheets

LENS DRIVING DEVICE, FLEXIBLE PIECE AND THE METHOD FOR MANUFACTURING THE FLEXIBLE PIECE

BACKGROUND OF THE INVENTION

1. Field of the Invention

The present invention relates to a lens displacement device; in particular, to a lens displacement device applicable for driving a micro imaging module lens and shortening the oscillation time.

2. Description of Related Art

An optical auto-focusing (AF) is to suitably move lens in an imaging module based on distance of an object from the lens, further allowing an optical image of the object to be accurately focused on an image sensor thereby creating a clear image. At the present, commonly used lens displacement devices for enabling movement of the lens in the imaging module may include a step motor, a piezoelectric motor and a voice coil motor (VCM) and the like.

Typically, mechanism of VCM is essentially implemented by placing a coil in the magnetic circuit comprising a permanent magnet. Therefore, according to Fleming's left-hand rule, the coil generates a driving force, which is from an interaction with the permanent magnet when the coil is electrically conducted, to move a lens holder connected to the permanent magnet and a lens assembly inside the lens holder. And corresponding optical zooming and focusing are achieved by having a current passing through the coil adjusted.

However, a restoration provided by VCM may take several milliseconds, which is relatively slower compared with other displacement methods, and thus at least one flexible component is additionally installed within the VCM to accelerate the restoration.

Figure 1:
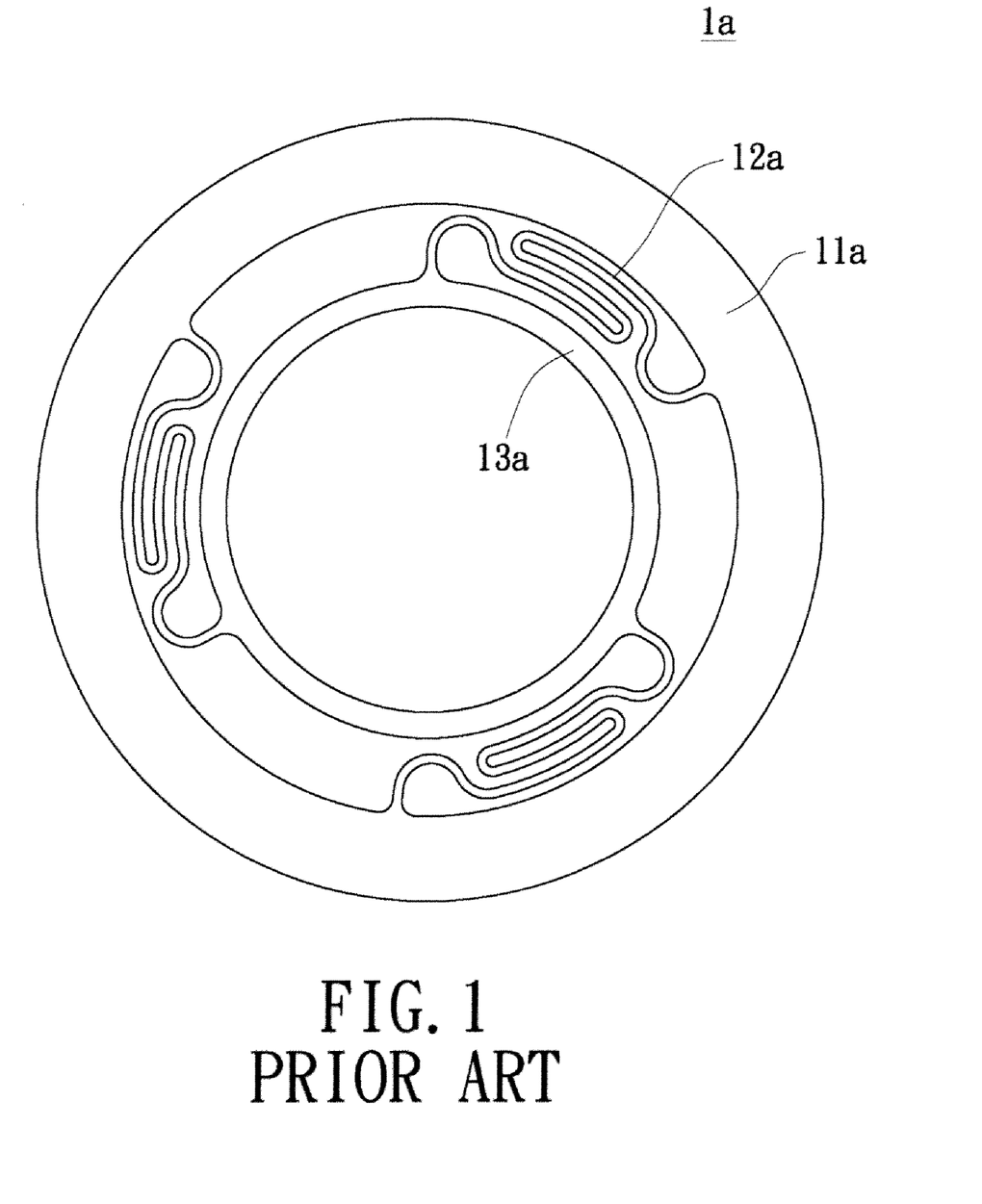
FIG. 1 shows a plan view of a flexible component in a conventional lens displacement device.

Refer now to FIG. 1, wherein Japan Patent Publication 2006-201525 discloses a flexible component 1a applied in the VCM. The flexible component includes an outer ring 11a, three meandering arms 12a extending from the outer ring 11a and an inner ring 13a installed inside the outer ring 11a and connected to an end of the meandering arm 12a. The inner ring 13a of the flexible component 1a is fixed to the lens holder of the VCM (not shown) with the outer ring 11a fixed to a base of the VCM. Therefore, the restoration provided by the VCM could be improved through the restoration force applied on the lens holder by the meandering arm 12a and the inner ring 13a.

Figure 2:
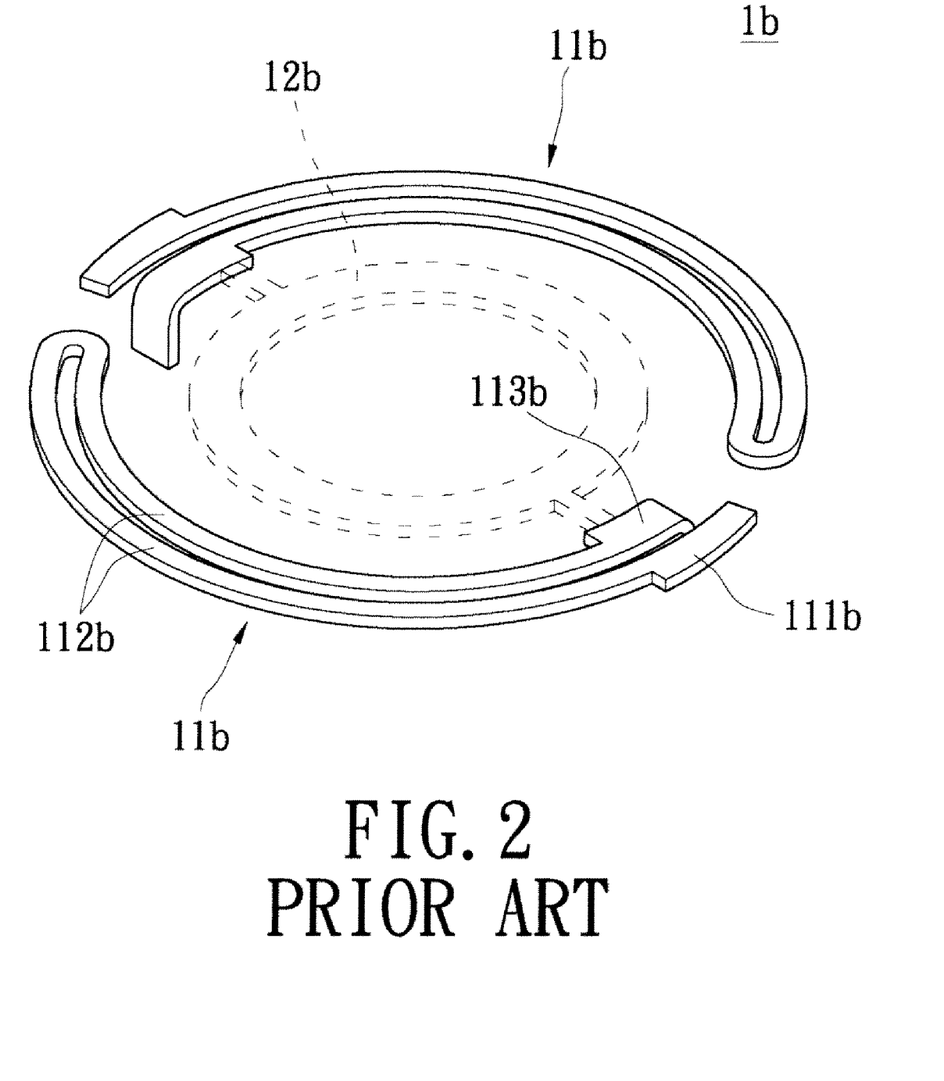
FIG. 2 shows a perspective view of a flexible component in another conventional lens displacement device.

Further refer to FIG. 2, wherein Japan Patent Publication 2003-295033 also discloses another flexible component 1b suitable for the VCM. The flexible component 1b provides two symmetrically C-shaped arc flexible arms 11b and a ring connector 12b. Each of the arc flexible arms 11b respectively bends at a first positioning end 111b and extends, and reversely bends and extends in a similar way to form a flexible arm 112b, and a second positioning end 113b is further formed at the end of the flexible arm 112b. The ring connector 12b is connected to these two arc flexible arms 11b. The first positioning end 111b of the two arc flexible arms 11b is placed at a base of the VCM with the second positioning end 113b positioned at the lens holder of the VCM. Accordingly, the restoration provided by the VCM could be improved through the restoration force applied on the lens holder by the flexible arm 112b and the ring connector 12b.

Through the flexible deformation in the aforementioned flexible components, the VCM with such flexible components provides contactless friction between the lens holder (mobile element) and the base (fixed element), further offering a feature of an accurate positioning. However, the aforementioned flexible component may undesirably result in excessively long oscillation time over the course of the positioning of the lens holder as well, undermining performance of an lens device featuring tracking AF. Therefore, as demands for dynamic imaging applications increase continually how to effectively shorten the oscillation time at the time of positioning the lens holder of the VCM has been one of tasks facing people having ordinary skill in the relevant field.

To facilitate better understanding of the characteristics and technical contents disclosed by the present invention, references are made to the following detailed descriptions and appended drawings; whereas the drawings shown hereunder are merely referential and exemplary, rather than intended to limit the present invention.

SUMMARY OF THE INVENTION

The present invention provides a lens displacement device, a flexible piece and a manufacturing process thereof, wherein the lens displacement device incorporates an internally installed flexible piece to achieve the objectives of effectively shortening the oscillation time required for the lens to position and accelerating the responsive speed toward a steady state.

A flexible piece according to a first embodiment of the present invention comprises a support, a flexible part and an oscillation absorber, in which at least one gap exists between the flexible part and the support. The oscillation absorber is installed in the gap between the support and the flexible part.

A flexible piece according to a second embodiment of the present invention comprises a support, a flexible part and an oscillation absorber, in which the flexible part is connected to the support and at least one gap exists in the flexible part. The oscillation absorber is installed the in the gap.

A lens displacement device according to the first embodiment of the present invention comprises a flexible piece, a fixed element and a mobile element, in which the flexible piece is the flexible piece. The fixed element is connected to the support of the flexible piece. The mobile element is connected to the flexible part of the flexible piece, wherein the flexible part of the flexible piece is deformed to provide a restoration force with the mobile element.

A lens displacement device according to the second embodiment of the present invention comprises a flexible piece, a fixed element and a mobile element, in which the flexible piece is the flexible piece. The fixed element is connected to the support of the flexible piece. The mobile element is connected to the flexible part of the flexible piece, wherein the flexible part of the flexible piece is deformed to provide a restoration force with the mobile element.

A manufacturing process for the flexible piece according to the first embodiment of the present invention comprises preparing a flexible substrate, forming a support and a flexible part from the flexible substrate, in which the flexible part is connected to the support and at least one gap exists between the flexible part and the support, and installing an oscillation absorber in the gap connected to the support and the flexible part.

A manufacturing process for the flexible piece according to the second embodiment of the present invention comprises preparing a flexible substrate, forming a support and a flexible part from the flexible substrate, in which the flexible part is connected to the support and at least one gap exists in the flexible part, and installing an oscillation absorber in the gap.

In summary, the present invention features the installation of an oscillation absorber in the gap existing between the support and the flexible part of the flexible piece or otherwise installs an oscillation absorber in the gap existing in the flexible part. In doing so, the present invention is capable of reducing an opening speed of the gap of the flexible piece and effectively absorbing the wobbles associated with the flexible piece in order to shorten an oscillation time and accelerate the responsive speed toward a steady state.

DETAILED DESCRIPTION OF THE PREFERRED EMBODIMENTS

Figure 3:
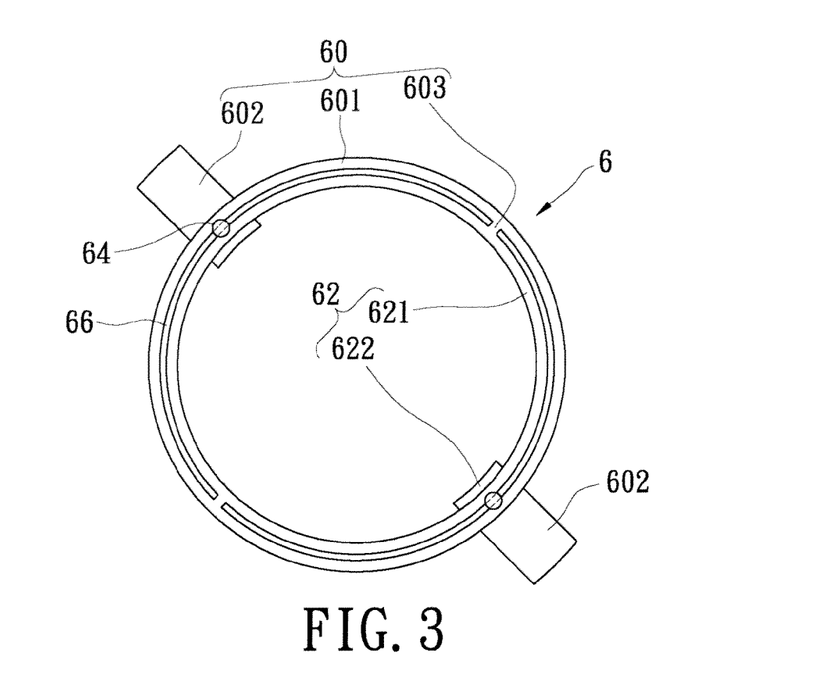
FIG. 3 shows a top view of a flexible piece according to a first embodiment of the present invention.

Refer now to FIG. 3, wherein a top view of a flexible piece according to a first embodiment of the present invention is shown. In the first embodiment, the flexible piece 6 is exemplarily depicted as a single piece and also an element fabricated by pressing, etching or molding process. As shown in FIG. 3, the flexible piece 6 comprises a support 60, a flexible part 62 and an oscillation absorber 64. The flexible part 62, or called elastic part, is connected to the support 60 and at least one gap 66, or preferably called interval, exists between the flexible part 62 and the support 60. The oscillation absorber 64 is installed in the gap 66 and wedged by the support 60 and the flexible part 62. In one implementation, the flexible piece 6 is a double-ring closed structure. In another implementation, the flexible piece 6 is a single-ring closed structure. The support 60 and the flexible part 62 of the flexible piece 6 are, in one implementation, monolithically fabricated.

As shown in FIG. 3, the support 60 in the flexible piece 6 has an outer framing plate 601 with a first positioning part 602 and two connecting arms 603 formed thereon. The flexible part 62 in the flexible piece 6 includes an inner framing plate 621 and a second positioning part 622 formed by the inner framing plate 621. The connecting arms 603 serve to connect the outer framing plate 601 and the inner framing plate 621 to ensure the inner framing plate 621 is inside of the outer framing plate 601 and the gap 66 exists between the inner framing plate 621 and the outer framing plate 601. Meanwhile, the oscillation absorber 64 is an elastic member, which is installed in the gap 66 and connected to the outer framing plate 601 and the inner framing plate 621. In one implementation, the oscillation absorber 64 is made of silica gel.

The outer framing plate 601 and the inner framing plate 621 of the flexible piece 6 may be of a ring-shaped frame in design so as to form a double-ring closed structure. The first positioning part 602 may be a part of an extension of an external wall of the outer framing plate 601 and the second positioning part 622 may be a part of an extension from an internal wall of the inner framing plate 621. The second positioning part 622 of the inner framing plate 621 is opposite to the first positioning part 602 of the outer framing plate 601, with the first positioning part 602 and the second positioning part 622 located in the same linear direction. Meanwhile, the connecting arms 603 are oppositely installed thereby interlacing equidistantly with the first positioning parts 602.

The manufacturing process for the flexible piece according to the first embodiment of the present invention will now be described as below. The manufacturing process comprises the following steps: initially, preparing a flexible substrate (not shown), forming the shape of the flexible piece 6 according to the first embodiment, such as a double-ring closed structure having the support 60, the flexible part 62 connected to the support 60, and the gap 66 between the flexible part 62 and the support 60, and installing the oscillation absorber 64 in the gap 66 for connecting the support 60 and the flexible part 62. In one implementation, the oscillation absorber 64 may be made of silica gel.

Furthermore, after the installation of the oscillation absorber 64 in the gap 66, the process may further include processing the oscillation absorber 64 by exposing the oscillation absorber 64 to an ultraviolet light for accelerating a solidification of the oscillation absorber 64 inside the gap 66.

Figure 4:
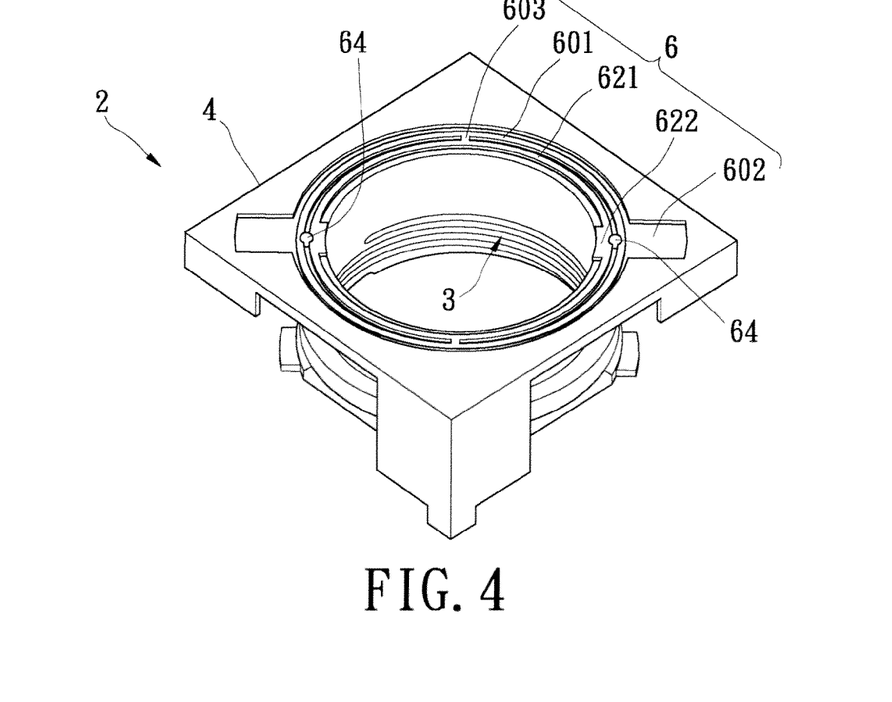
FIG. 4 shows a perspective view of a lens displacement device according to the first embodiment of the present invention.

Refer next to FIG. 4, wherein a perspective view of a lens displacement device according to the first embodiment of the present invention is shown. The flexible piece 6 may be installed inside a lens displacement device 2, or called lens driving device. The lens displacement device 2 includes the flexible piece 6, a mobile element 3 and a fixed element 4. The mobile element 3, or called movement barrel, has a lens holder (not shown) for carrying a lens assembly and a magnetic component. The magnetic component is installed on the lens holder. Besides, the fixed element 4, or called fixed barrel, includes a fixed seat and a coil assembly installed inside of the fixed seat. The aforementioned mobile element 3 and fixed element 4 are of well-known technologies whose relevant structures will not be further illustrated for a compact prosecution of the application.

As depicted in FIG. 4, relative to the fixed element 4, the mobile element 3 in the lens displacement device 2 may be movably installed inside of the fixed element 4. An electromagnetic field may be created when the coil assembly is electrically conducted, and the magnetic lines from the electromagnetic field and the magnetic component interact thereby further generating an electromagnetic force, which axially drives the mobile element 3 on the fixed element 4. Additionally, in another implementation the magnetic component may be installed on the fixed seat to form the fixed element 4, and the coil assembly may be installed on the lens holder to form the mobile element 3.

Refer again to FIG. 4. In the lens displacement device 2, the outer framing plate 601 and the first positioning part 602 of the flexible piece 6 are fixedly installed on the fixed element 4. At the same time, the inner framing plate 621 and the second positioning part 622 of the flexible piece 6 are connected to the mobile element 3. Accordingly, when the mobile element 3 moves to drive the second positioning part 622 of the inner framing plate 621 the inner framing plate 621 as well as the outer framing plate 601 may be deformed as the result of the movement and the positioning of the mobile element 3 with the second positioning part 622 providing a restoration force with the mobile element 3.

Figure 5:
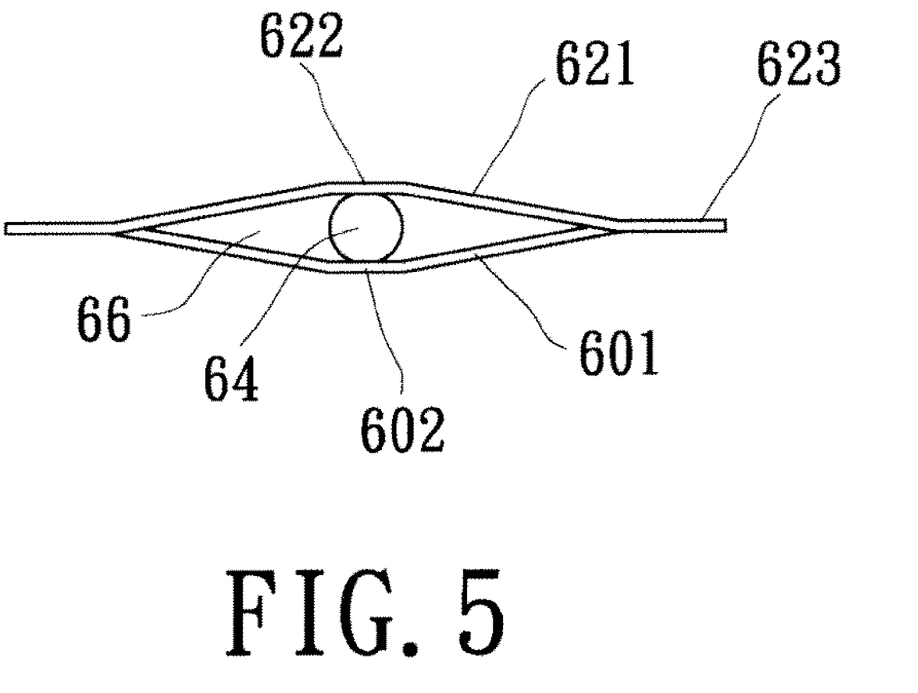
FIG. 5 shows a diagram of flexible deformation in the flexible piece according to the first embodiment of the present invention.

Refer next to FIG. 5 in conjunction with FIG. 4, wherein a diagram illustrating a deformation of the flexible piece according to the first embodiment of the present invention is shown. The inner framing plate 621 and the outer framing plate 601 of the flexible piece 6 may be flexible so that the inner framing plate 621 and the outer framing plate 601 may be deformed as the mobile element 3 moves and positions, thereby allowing for the gap 66 between the inner framing plate 621 and the outer framing plate 601 to form a three-dimension opening. At this point, the oscillation absorber 64 installed inside of the gap 66 and connected to the inner framing plate 621 and the outer framing plate 601 may serve as a damper relative to the mobile element 3. Consequently, the oscillation time for the mobile element 3 when the mobile element 3 moves and positions may be shortened, further allowing the mobile element 3 to be entering into its respective steady state in a prompt fashion.

The oscillation absorber 64 on the flexible piece 6 may be made of a soft material of plasticity; e.g., silica gel. When the mobile element 3 moves, such soft material may be adapted to slow down an opening speed of the gap 66 between the inner framing plate 621 and the outer framing plate 601 of the flexible piece 6 and to also absorb wobbling associated with the deformation of the inner framing plate 621 and the outer framing plate 601. In other words, that the oscillation absorber 64, in one implementation, is made of the soft material of plasticity facilitates a damper. The oscillation absorber 64 may be installed at a predetermined position of the gap 66 between the inner framing plate 621 and the outer framing plate 601, and that predetermined position of the gap 66 may correspond to a largest opening when compared with the rest area of the gap 66.

Therefore, with one end of the flexible piece 6 fixedly connected to the fixed element 4 of the lens displacement device 2 and the other end thereof connected to the mobile element 3 inside of the fixed element 4 the wobbling affecting the lens displacement device 2 when the mobile element 3 moves and positions may be reduced while the oscillation time may be significantly shortened and the steady state may be promptly entered.

Figure 6:
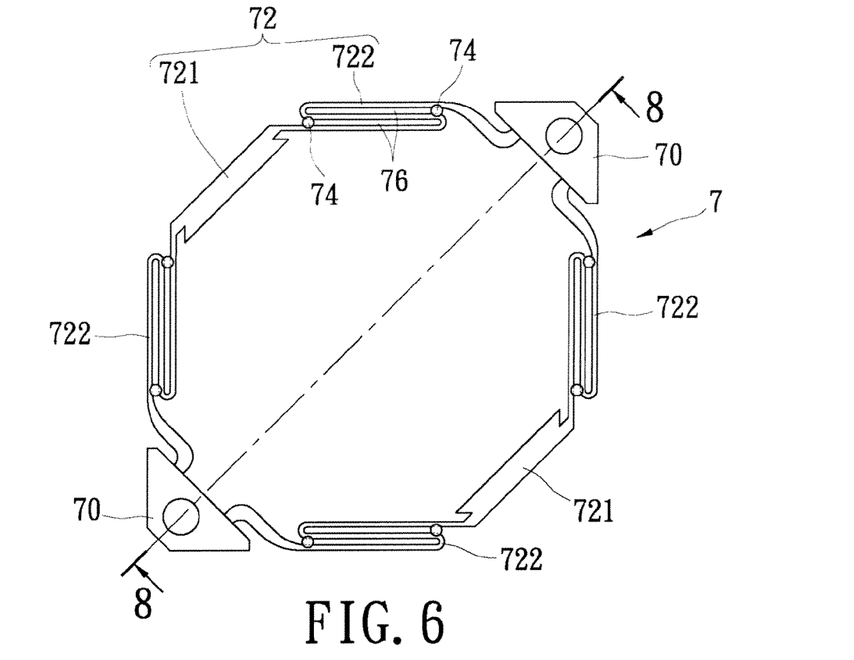
FIG. 6 shows a top view of a flexible piece according to a second embodiment of the present invention.

Refer subsequently to FIG. 6, wherein a top view of a flexible piece according to a second embodiment of the present invention is shown. In the second embodiment, the flexible piece 7 is exemplarily depicted as a single piece and also an element fabricated by pressing, etching or molding process. As shown in FIG. 6, the flexible piece 7 comprises a support 70, a flexible part 72 and an oscillation absorber 74, wherein the flexible part 72 has a displacing part 721 and at least one meandering part 722. The meandering part 722, or called sinuous segment, is sinuously and integrally extended from the displacing part 721. The displacing part 721 is connected to the support 70 through the meandering part 722, and at least one interval 76 is formed in the meandering part 722. Besides, the oscillation absorber 74 is installed in the gap 76 and wedged in the sinuous segment. The flexible piece 7 is a double-ring closed structure in one implementation and could be a single-ring closed structure in another implementation. The support 70 and the flexible part 72 of the flexible piece 7 may be monolithically formed.

As shown in FIG. 6, in the second embodiment, the support 70 of the flexible piece 7 consists of two first plates, the displacing part 721 of the flexible part 72 consists of two second plates, and the meandering part 722 of the flexible part 72 has four meandering bodies. Each of the meandering bodies may be connected to the first plate and the second plate and may be located between the first plate and the second plate, so as to form the flexible piece 7 in the single-ring closed structure.

Refer once again to FIG. 6, in which a manufacturing process for the flexible piece according to the second embodiment of the present invention is described. The manufacturing process comprises the following steps: preparing a flexible substrate, forming the flexible piece 7 including the support 70 and the flexible part 72 connected to the support 70, and at least one gap 76 in the meandering part 722 of the flexible part 72, and installing the oscillation absorber 74 in the gap 76.

Furthermore, after the installation of the oscillation absorber 74 in the gap 76, the manufacturing process may further include processing the oscillation absorber 74 with an ultraviolet light to accelerate the solidification of the oscillation absorber 74.

Figure 7:
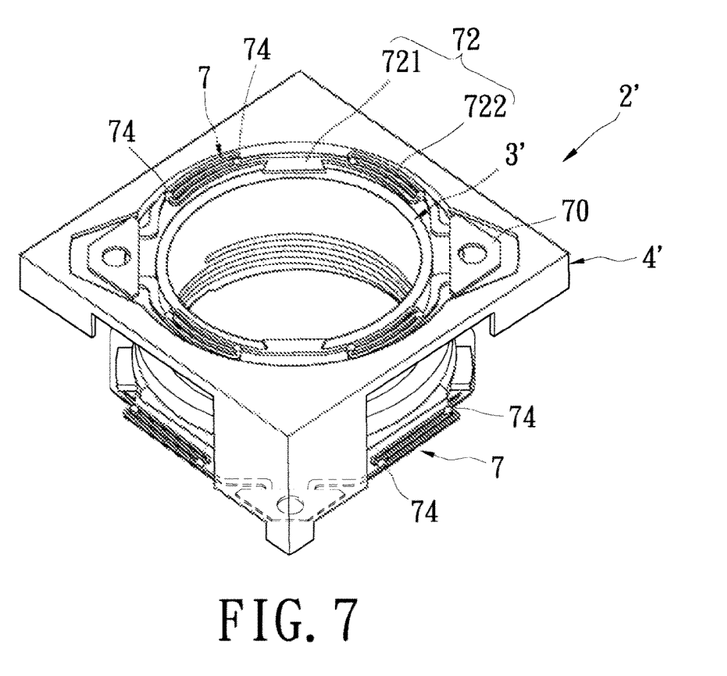
FIG. 7 shows a perspective view of a lens displacement device according to the second embodiment of the present invention.

Refer next to FIG. 7, wherein a perspective view of a lens displacement device according to the second embodiment of the present invention is shown. The flexible piece 7 according to the present embodiment may be installed inside of a lens displacement device 2' further including a mobile element 3' and a fixed element 4'. The mobile element 3' consists of a lens holder for carrying a lens assembly and a magnetic component. Meanwhile, the magnetic component may be installed on the lens holder. Besides, the fixed element 4' also includes a fixed seat and a coil assembly installed inside of the fixed seat. The mobile element 3' and fixed element 4' are of well-known technologies whose relevant structures will not be further illustrated for the purpose of compact prosecution.

As depicted in FIG. 7, relative to the fixed element 4', the mobile element 3' in the lens displacement device 2' may be movably installed inside of the fixed element 4'. An electromagnetic field may be created when the coil assembly is electrically conducted, and the magnetic lines from the electromagnetic field and the magnetic component interact thereby further generating an electromagnetic force that axially drives the mobile element 3' on the fixed element 4'. Additionally, the above configuration may be altered in which the magnetic component may be installed on the fixed seat as a part of the fixed element 4', and the coil assembly may be installed on the lens holder to form the mobile element 3'.

Refer again to FIG. 7. In the lens displacement device 2', the support 70 of the flexible piece 7 is fixedly installed on the fixed element 4'. At the same time, the flexible part 72 of the flexible piece 7 is connected to the mobile element 3'. When the mobile element 3' moves to drive the flexible part 72, the flexible part 72 may be deformed. More specifically, the meandering part 722 of the flexible part 72 may move and be deformed along with the mobile element 3' with the displacing part 721 providing the restoration force to compensate the movement and the deformation.

Figure 8:
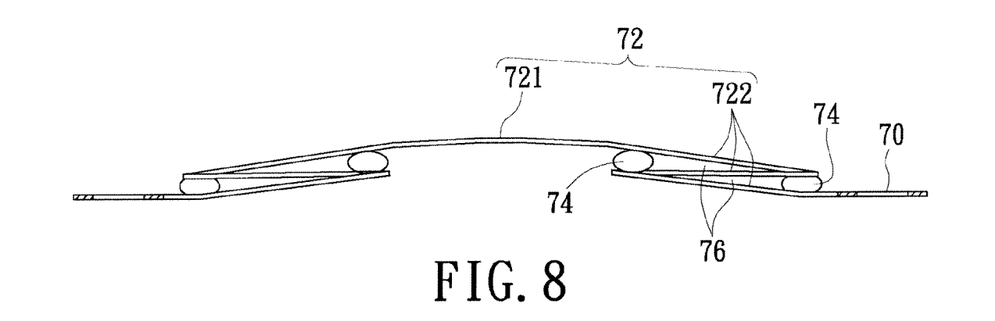
FIG. 8 shows a diagram of flexible deformation in the flexible piece according to the second embodiment of the present invention.

Refer next to FIG. 8 in conjunction with FIG. 7, wherein a diagram of flexible deformation in the flexible piece according to the second embodiment of the present invention is shown. The flexible part 72 of the flexible piece 7 may be deformed as the mobile element 3' moves and positions, thereby allowing for the gap 76 in the meandering part 722 of the flexible part 72 to be three-dimensionally opened. At this point, the oscillation absorber 74 installed inside of the gap 76 may serve as the damper on the mobile element 3' so as to shorten the oscillation time as the mobile element 3' moves and positions, and to have the mobile element 3' to enter into its respective steady state more promptly.

The oscillation absorber 74 on the flexible piece 7 may be made of a soft material of plasticity; e.g., silica gel. When the mobile element 3' moves, the oscillation absorber 74 made of the soft material may slow down the opening speed of the gap 76 in the meandering part 722 and also absorb the wobbles as the meandering part 722 deforms. In other words, the oscillation absorber 74 may serve as a damper. The oscillation absorber 74 may be installed at a predetermined position of the gap 76 in the meandering part 722, and the predetermined position of the gap 76 may correspond to a largest opening when compared with the rest area of the gap 76.

With one end of the flexible piece 7 fixedly connected to the fixed element 4' of the lens displacement device 2' and the other end thereof connected to the mobile element 3' inside of the fixed element 4', the lens displacement device 2' may not be significantly affected by the wobbles of the flexible piece as the mobile element 3' moves and positions. Moreover, the lens displacement device 2' may be associated with a significantly-reduced oscillation time and capable of entering into its steady state of in a prompt manner.

Figure 9A:
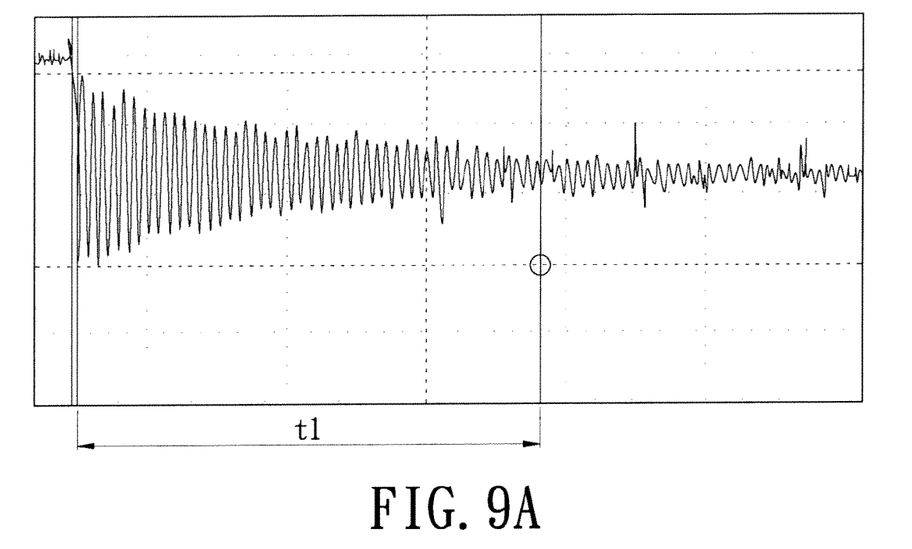
FIG. 9A shows the oscillation waveform of positioning response in the lens displacement device without the flexible piece according to the present invention.
Figure 9B:
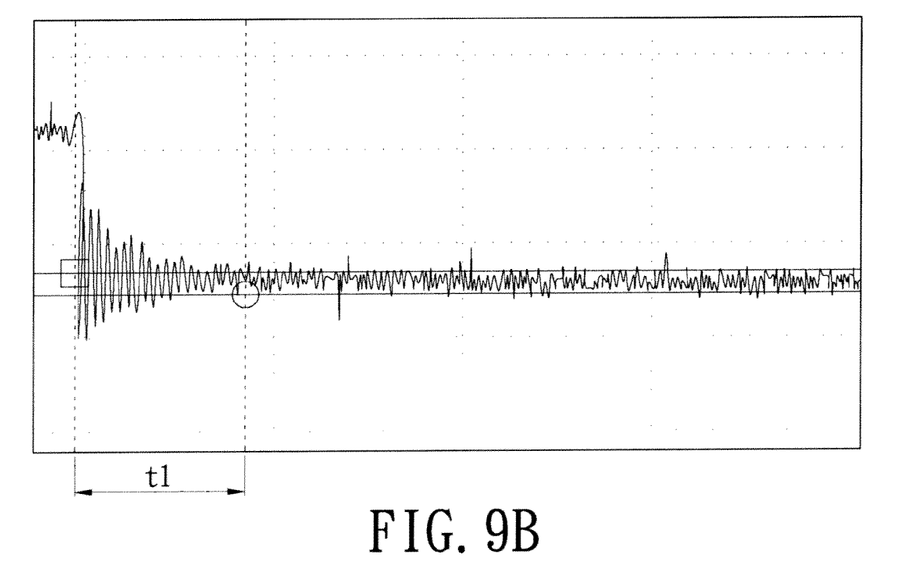
FIG. 9B shows the oscillation waveform of positioning response in the lens displacement device with the flexible piece according to the present invention.

Refer next to FIG. 9A and FIG. 9B, wherein FIG. 9A shows an oscillation waveform of a positioning response in the lens displacement device without the flexible piece, and FIG. 9B shows an oscillation waveform of a positioning response in the lens displacement device with the flexible piece according to the present invention. It can be observed from FIG. 9A and FIG. 9B that for the lens displacement device 2 installed with the flexible piece 6 or the lens displacement device 2' installed with the flexible piece 7, the oscillation time has been significantly shortened and the steady state has been more promptly entered.

In summary, the present invention features the installation of an oscillation absorber in the gap between the support and the flexible part of the flexible piece or otherwise the installation of an oscillation absorber in the gap in the flexible part. Therefore, the opening speed of the gap presented in the flexible piece may be reduced and the wobbles associated with the flexible piece may be effectively absorbed to shorten the oscillation time and accelerate the responsive speed toward the steady state. In this way, the lens displacement device internally installed with the flexible piece according to the present invention may have the oscillation time during which the lens position effectively shortened and also accelerate the responsive speed to the steady state.

The descriptions illustrated supra set forth simply the preferred embodiments of the present invention; however, the characteristics of the present invention are by no means restricted thereto. All changes, alternations, or modifications conveniently considered by those skilled ones in the art are deemed to be encompassed in the scope of the present invention delineated by the following claims.

What is claimed is:

1. A flexible piece of lens driving device for shortening oscillation time during optical focusing, wherein the lens driving device has a fixed barrel and a movement barrel movably connected to the fixed barrel for moving a lens related to the fixed barrel, comprising:
   a support fixedly installed on the fixed barrel;
   an elastic part, extended from the support and connected to the movement barrel, in which at least one interval formed between the elastic part and the support; and
   an oscillation absorber installed in the interval and wedged by the support and the elastic part.

2. The flexible piece of lens driving device according to claim 1, wherein the elastic part and the support are arranged in non-coplanar manner to define the interval with uneven distance, the oscillation absorber is installed in a predetermined position that corresponds to a largest distance in the interval between the elastic part and the support.

3. The flexible piece of lens driving device according to claim 1, wherein the support is connected to the elastic part so as to form the flexible piece in a double-ring closed structure or alternatively in a single-ring closed structure.

4. The flexible piece of lens driving device according to claim 3, wherein the support and the elastic part are monolithically formed.

5. A flexible piece of lens driving device for shortening oscillation time during optical focusing, wherein the lens driving device has a fixed barrel and a movement barrel movably connected to the fixed barrel for moving a lens related to the fixed barrel, comprising:
   a support fixedly installed on the fixed barrel;
   an elastic part, having at least one sinuous segment extended from the support and connected to the movement barrel, in which at least one interval defined in the sinuous segment; and
   an oscillation absorber installed in the interval and wedged by the sinuous segment.

6. The flexible piece of lens driving device according to claim 5, wherein the elastic part has a displacing part and a at least one sinuous segment extended from the displacing part, wherein the displacing part connects to the support through the sinuous segment and the at least one interval exists in the sinuous segment.

7. The flexible piece of lens driving device according to claim 6, wherein the oscillation absorber is installed in a largest opening of the interval of the sinuous segment.

8. The flexible piece of lens driving device according to claim 6, wherein the displacing part is connected to the support through the sinuous segment so as to form the flexible piece in a double-ring closed structure or alternatively in a single-ring closed structure.

9. The flexible piece of lens driving device according to claim 8, wherein the sinuous segment, the displacing part and the support are monolithically formed.

10. A lens driving device, comprising:
    a flexible piece, having a support, an elastic part and an oscillation absorber, in which the elastic part is sinuously extended form the support, at least one interval formed between the elastic part and the support, and the oscillation absorber is installed in the interval and wedged by the support and the elastic part;
    a fixed barrel, fixedly connected to the support of the flexible piece; and
    a movement barrel, connected to the elastic part of the flexible piece, in which the elastic part of the flexible piece is deformed to provide a restoration force with the movement barrel.

11. A lens driving device, comprising:
    a flexible piece having a support, an elastic part sinuously extended form the support, and an oscillation absorber, wherein at least one interval is formed in the elastic part, and the oscillation absorber is installed in the interval;
    a fixed barrel, connected to the support of the flexible piece; and
    a movement barrel, movably connected to the fixed barrel for moving a lens related to the fixed barrel, the movement barrel connected to the elastic part of the flexible piece, in which the elastic part of the flexible piece is deformed to provide the movement barrel with a restoration force.

12. A method for manufacturing a flexible piece of lens driving device, comprising:
    preparing a flexible substrate;

forming a support and an elastic part from the flexible substrate, in which the elastic part is sinuously extended from the support and at least one interval formed between the elastic part and the support; and installing an oscillation absorber in the interval wedged by the support and the elastic part.

13. The method for manufacturing the flexible piece according to claim 12, wherein the oscillation absorber is made of silica gel in spherical-shaped, and further comprising a step of processing the oscillation absorber by an ultraviolet light for accelerating a solidification of the oscillation absorber.

14. A method for manufacturing the flexible piece, comprising:

preparing a flexible substrate;

forming a support and an elastic part from the flexible substrate, in which the elastic part is sinuously extended from the support and the elastic formed with at least one sinuous segment to define at least one interval in the elastic part; and installing an oscillation absorber in the interval and wedged by the sinuous segment.

15. The method for manufacturing the flexible piece according to claim 14, further comprising processing the oscillation absorber by an ultraviolet light.

* * * * *